March 23, 1954 O. INGRAM ET AL 2,672,645
PINTLE TYPE HINGE FOR FLOW RACKS AND THE LIKE
Filed March 21, 1951 3 Sheets-Sheet 1

INVENTORS
Orville Ingram and
Norman T. Anderson
BY Jewett, Mead & Brown
ATTORNEYS

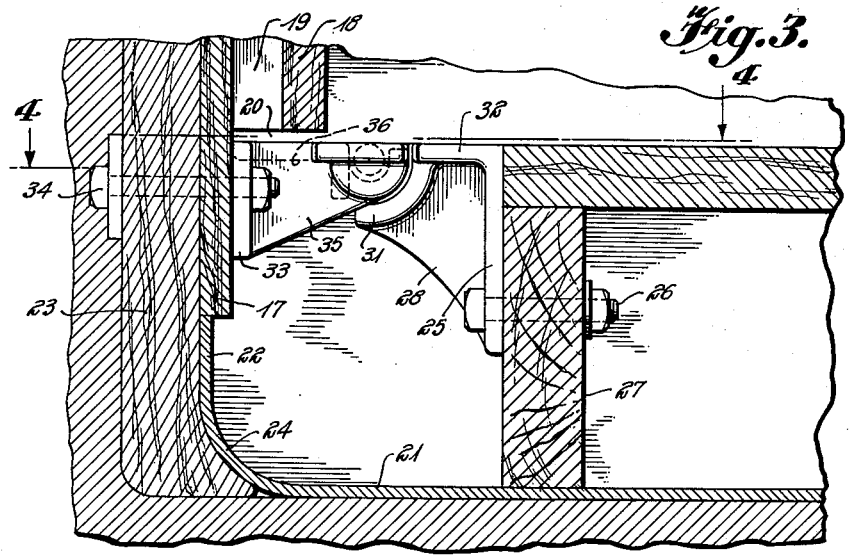
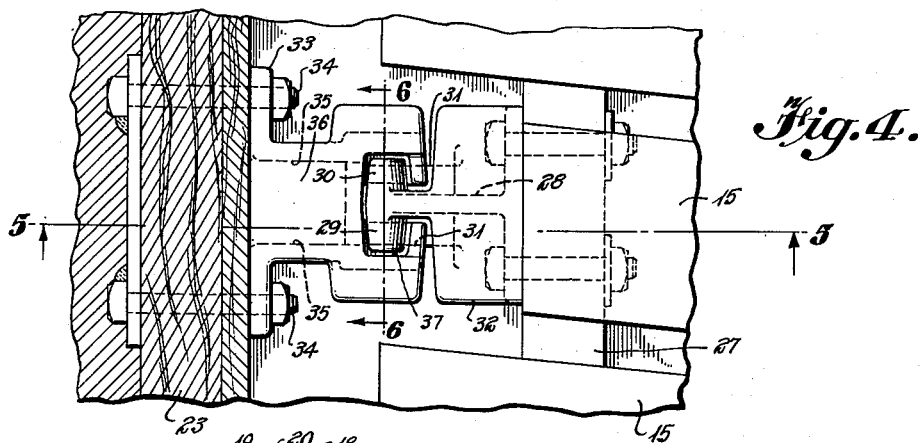
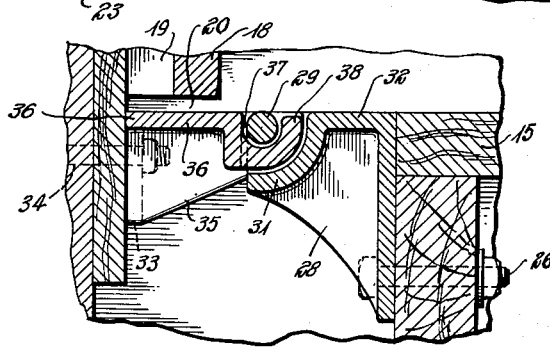
INVENTORS
Orville Ingram &
Norman T. Anderson
BY Jewett, Mead & Brown
ATTORNEYS March 23, 1954 — O. INGRAM ET AL — 2,672,645
PINTLE TYPE HINGE FOR FLOW RACKS AND THE LIKE
Filed March 21, 1951 — 3 Sheets-Sheet 3

INVENTORS
Orville Ingram and
Norman T. Anderson
BY Jewett, Murad & Browne
ATTORNEYS Patented Mar. 23, 1954

2,672,645

UNITED STATES PATENT OFFICE 2,672,645

PINTLE TYPE HINGE FOR FLOOR RACKS AND THE LIKE

Orville Ingram, Alexandria, Va., and Norman T. Anderson, Washington, D. C.

Application March 21, 1951, Serial No. 216,714

1 Claim. (Cl. 16—135)

The invention relates to hinges, particularly hinges about which the floor racks or gratings of refrigerator cars and the like may be raised for cleaning the underlying floor.

It is an object of the invention to provide a hinge that will not provide a recess in which brine or other water may collect to cause rusting of the hinge.

It is a further object to provide a hinge that will prevent removal of the floor grating while in a horizontal position.

Further objects will appear from the following description when read in the light of the accompanying drawing showing illustrative embodiments of the invention and wherein:

Fig. 3 is a detail vertical section corresponding to a portion of Fig. 2 on an enlarged scale;

Fig. 4 is a horizontal section on line 4—4 of Fig. 3;

Fig. 5 is a detail vertical section on line 5—5 of Fig. 4;

Figure 1:
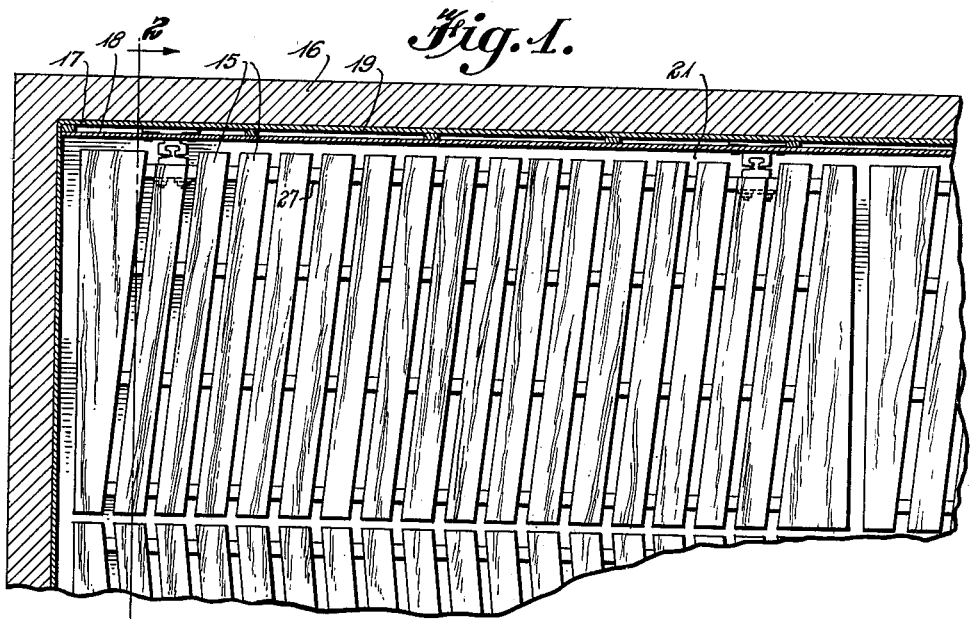
Fig. 1 is a plan view of a portion of a refrigerator car equipped with hinges of the invention and showing a portion of the walls of the car in horizontal section.
Figure 2:
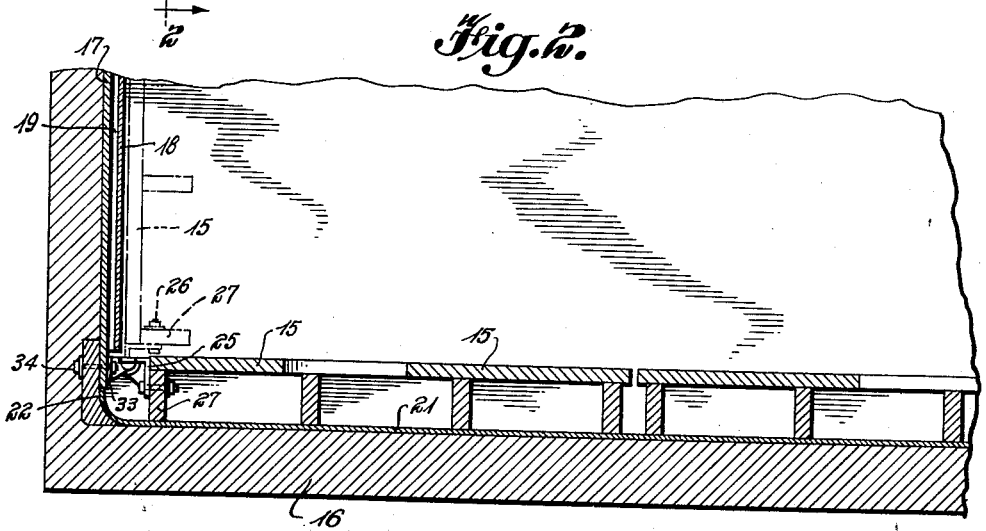
Fig. 2 is a detail vertical section on line 2—2 of Fig. 1, showing the grating raised in dotted lines.
Figure 6:
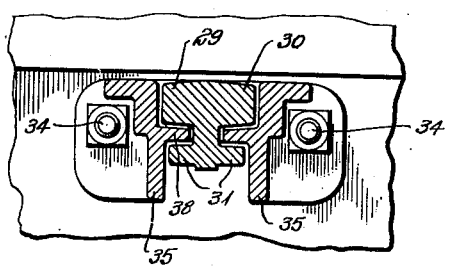
Fig. 6 is a transverse section on line 6—6 of Fig. 4.

As shown in Fig. 1, the device is applied to a grating of what might be called a herringbone type, wherein the slats 15 are at a slight angle to perpendicular lines drawn across a car, the insulating layer of which is shown at 16.

Between an inner lining 17 and a partition 18 there is provided a space for circulation of air, 19, which opens at the bottom, as indicated at 20 of Fig. 3, and as is customary with cars of the refrigerator type, a waterproof floor lining is indicated at 21 turned up at the edges as at 22, a base member for liner 17 being shown at 23 and milled to provide a support for the cove 24 of the waterproofing layer 21.

In the form of grating shown in Fig. 1, the hinge of the invention is formed of a plate 25 secured by bolts 26 to a stringer 27 of the floor grating. The plate 25 as shown in Figs. 3 to 6, inclusive, is formed with a web such as central rib 28 carrying a pair of pintle-providing projections 29, 30 and arcuate flanges or wings 31, which latter curve downwardly from the top web 32 of this portion of the hinge. The portion which is bolted to the side of the car comprises a plate portion 33 secured by bolts 34 to the side of the car and formed with a pair of laterally extending web members 35 supporting an upper plate portion 36 which at its upper surface is T-shaped. As shown in Fig. 4, the branches of the T are formed with depressions 37 for receipt of the pintle members 29, 30. Between the depressions 37 the material of the fixed bracket is cut out so that any liquid gathering in depressions 37 may be freely discharged.

It will be seen that when the grating equipped with hinges of the invention is upon the floor the hinge cannot be separated by vertical movement of the grating which is readily apparent from an inspection of Figs. 3 and 5.

When the grating has been raised to an angle of substantially 45° then the arcuate members 31 may be lifted past the members 38 which form an outer edge of the depressions 37 and the grating may thus be freely removed without removing any pintle pins, nuts, bolts or cotter pins. The grating therefore cannot readily be removed by a single person which fact is of importance as it is found these structures are often surreptitiously removed while the cars are standing empty and open upon a side-track and, being so removed, are used for fuel.

Figure 7:
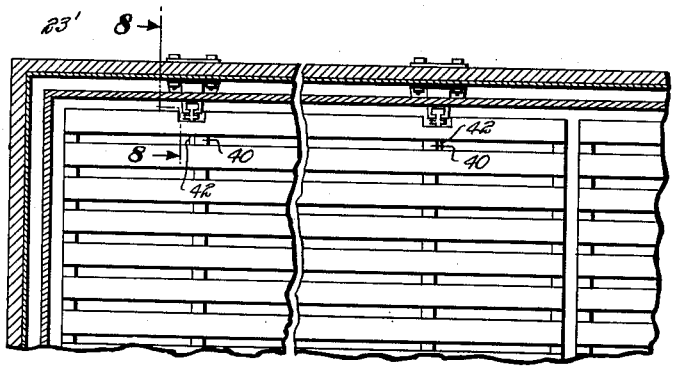
Fig. 7 is a section corresponding to Fig. 1, showing the hinge of the invention applied to a grating of a different form.
Figure 8:
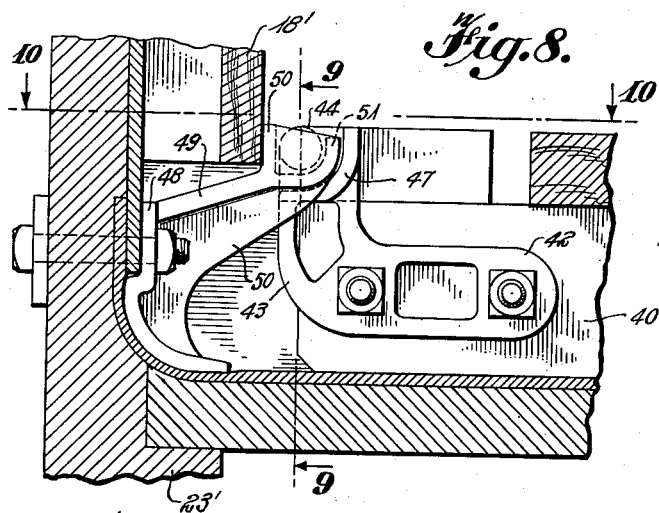
Fig. 8 is a detail section on line 8—8 of Fig. 7 on an enlarged scale.
Figure 9:
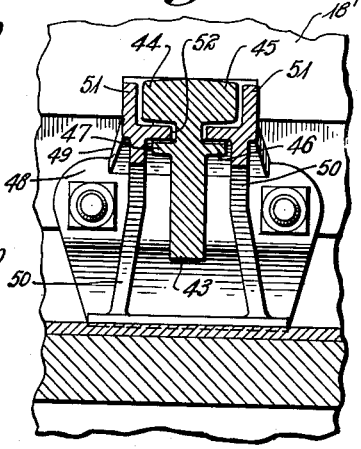
Fig. 9 is a vertical section on line 9—9 of Fig. 8.
Figure 10:
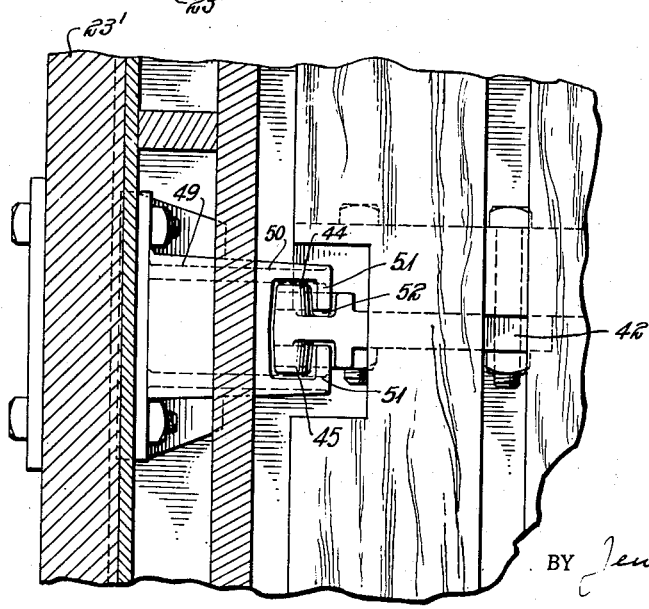
Fig. 10 is a horizontal section on line 10—10 of Fig. 8.

The form of grating shown in Fig. 7, having transverse stringers 40 instead of the longitudinal stringers shown in Fig. 1, calls for a modification of the hinge such as is shown in Figs. 7 to 10, inclusive. As there shown, the plate 42 for bolting to the stringer 40 is formed with a rib 43 carrying the pintle projections 44, 45 and the arcuate flanges or wings 46, 47. Plate 48 bolted to the base member 23' carries a member 49 projecting inwardly of the car to a vertical portion 50 of said member which bears against the inner partition 18', the member 49 beyond the plate portion 50 being formed with arcuate portions 51 spaced apart at the center as at 52 to provide for drainage in the same manner as already described in reference to depressions 37 in connection with Figs. 3 to 6, inclusive.

The function of the various portions of the hinge of Figs. 7 to 10, inclusive, is the same as already described in connection with Figs. 3 to 5, Minor changes may be made in the physical embodiments of the invention within the scope of the appended claim without departing from the spirit of the invention.

We claim:

A refrigerator car floor grate hinge comprising, in combination: first and second bracket members for attachment to the car structure and to the floor grate structure, respectively, said first member having a first plate portion for attachment to a vertical wall of said car structure, a first vertically extending web portion carried by said first plate portion and extending laterally from said first plate portion toward the interior of said car, substantially horizontally extending aligned spaced projections carried by said first web portion, said projections having an arcuate outer surface and comprising a cup-like upwardly open pintle receiving recess having an arcuate pintle supporting surface; said second member having a second plate portion for attachment to said floor grate, a substantially vertically extending second web portion carried by said second plate portion and extending between said spaced projections of said first member, horizontally extending pintle means carried by said second web portion and seated in said pintle receiving recess, said pintle means having an arcuate outer surface, a horizontally extending top web portion attached to the upper portion of said second vertically extending web portion intermediate said second plate portion and said pintle means, said top web portion being positioned at substantially the same level as the upper surface of said floor grate and forming in effect a continuation of said floor grate surface, and a wing portion extending laterally from at least one surface of said second web portion, said wing portion having a radially inner arcuate surface spaced radially outwardly of said arcuate outer surface of said pintle means, said radially inner arcuate surface being adapted to move in an arcuate path adjacent and radially outwardly of the outer surface of at least one of said projections for at least 45 degrees angular rotation of said floor grate structure from a horizontal position when said floor grate is rotated on said pintle means about a horizontal axis.

ORVILLE INGRAM.
NORMAN T. ANDERSON.

References Cited in the file of this patent

UNITED STATES PATENTS

| Number | Name | Date |
|---|---|---|
| 678,701 | Tuor | July 16, 1901 |
| 704,590 | Stimson | July 15, 1902 |
| 771,654 | Meek | Oct. 4, 1904 |
| 1,749,322 | Chryst | Mar. 4, 1930 |
| 1,842,177 | Johnson | Jan. 19, 1932 |
| 2,106,852 | Olander | Feb. 1, 1938 |
| 2,161,923 | Haseltine | June 13, 1939 |
| 2,254,356 | Dwyer | Sept. 2, 1941 |
| 2,256,180 | Torburn | Sept. 16, 1941 |
| 2,603,169 | Jahn | July 15, 1952 |

FOREIGN PATENTS

| Number | Country | Date |
|---|---|---|
| 588,493 | Germany | Nov. 24, 1933 |
| 730,039 | France | Aug. 5, 1932 |